(12) United States Patent
Maguire et al.

(10) Patent No.: US 9,087,281 B2
(45) Date of Patent: *Jul. 21, 2015

(54) DUAL-FREQUENCY RFID TAG WITH ISOLATED INPUTS

(75) Inventors: Yael Maguire, Somerville, MA (US); Ronald A. Oliver, Seattle, WA (US); Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 308 days.

This patent is subject to a terminal disclaimer.

(21) Appl. No.: 13/196,877

(22) Filed: Aug. 2, 2011

(65) Prior Publication Data
US 2011/0285511 A1    Nov. 24, 2011

Related U.S. Application Data

(63) Continuation-in-part of application No. 12/483,842, filed on Jun. 12, 2009.

(51) Int. Cl.
| | |
|---|---|
| *G08C 19/12* | (2006.01) |
| *G08B 25/00* | (2006.01) |
| *G08B 13/14* | (2006.01) |
| *G08B 21/00* | (2006.01) |
| *G06K 19/00* | (2006.01) |

(Continued)

(52) U.S. Cl.
CPC ...... *G06K 19/0724* (2013.01); *G06K 19/07767* (2013.01); *H01Q 1/2225* (2013.01); *H01Q 1/248* (2013.01); *H01Q 21/30* (2013.01); *H04Q 2213/095* (2013.01)

(58) Field of Classification Search
CPC ............ G06K 7/0008; G06K 19/0724; G06K 19/07767; G06K 19/07786; G06K 7/10356; G06K 19/0712; G06K 19/07779; G06K 19/07796; H01Q 1/2216
USPC ................................................ 340/10.1–10.6
See application file for complete search history.

(56) References Cited

U.S. PATENT DOCUMENTS

| | | | | |
|---|---|---|---|---|
| 5,491,468 A | * | 2/1996 | Everett et al. ............... | 340/10.34 |
| 5,510,769 A | * | 4/1996 | Kajfez et al. ............... | 340/572.5 |

(Continued)

OTHER PUBLICATIONS

Non-Final Office Action U.S. Appl. No. 12/483,842 mailed Oct. 9, 2012.

(Continued)

*Primary Examiner* — Steven Lim
*Assistant Examiner* — Muhammad Adnan
(74) *Attorney, Agent, or Firm* — Turk IP Law, LLC

(57) ABSTRACT

An Integrated Circuit (IC) for an RFID tag includes two electrically isolated antenna ports for connecting to two antennas, with each antenna port configured to operate at a different frequency range and/or with a different communications protocol. In some embodiments a rectifier coupled to one of the antenna ports is operable to extract energy from an electromagnetic field in a first frequency range, and a demodulator coupled to the other antenna port is operable to demodulate symbols according to an RFID protocol in a second frequency range. In some embodiments the frequency ranges are disjoint, intersecting, or one is a proper subset of the other. In some embodiments each port is coupled to its own rectifier and/or its own modulator and/or its own demodulator. In some embodiments an RFID tag includes the IC and two antennas, each operable in one of the two frequency ranges.

19 Claims, 12 Drawing Sheets

DUAL-DIFFERENTIAL TAG IC

(51) Int. Cl.
*G06K 19/07* (2006.01)
*G06K 19/077* (2006.01)
*H01Q 1/22* (2006.01)
*H01Q 1/24* (2006.01)
*H01Q 21/30* (2006.01)

(56) References Cited

U.S. PATENT DOCUMENTS

| | | | |
|---|---|---|---|
| 6,243,013 B1 | 6/2001 | Duan et al. | |
| 6,617,963 B1* | 9/2003 | Watters et al. | 340/10.41 |
| 6,812,824 B1* | 11/2004 | Goldinger et al. | 340/10.1 |
| 7,183,994 B2* | 2/2007 | Weigand | 343/795 |
| 7,477,196 B2* | 1/2009 | Asrani et al. | 343/700 MS |
| 7,511,621 B1 | 3/2009 | Duan et al. | |
| 7,579,955 B2 | 8/2009 | Pillal | |
| 7,994,923 B2* | 8/2011 | Watanabe et al. | 340/572.7 |
| 8,026,818 B2* | 9/2011 | Cote et al. | 340/572.7 |
| 8,258,958 B2* | 9/2012 | Kang et al. | 340/572.7 |
| 8,350,701 B2* | 1/2013 | Carrender et al. | 340/572.7 |
| 8,544,758 B2* | 10/2013 | Wilkinson | 235/492 |
| 2001/0035813 A1* | 11/2001 | Meier | 340/5.72 |
| 2001/0048361 A1* | 12/2001 | Mays et al. | 340/10.51 |
| 2002/0021249 A1 | 2/2002 | Kuck | |
| 2003/0013146 A1* | 1/2003 | Werb | 435/9 |
| 2005/0248438 A1* | 11/2005 | Hughes et al. | 340/10.4 |
| 2006/0145855 A1* | 7/2006 | Diorio et al. | 340/572.1 |
| 2007/0126583 A1 | 6/2007 | Maniwa et al. | |
| 2007/0128760 A1 | 6/2007 | Subramanian et al. | |
| 2007/0216533 A1* | 9/2007 | Hyde et al. | 340/572.4 |
| 2007/0222610 A1* | 9/2007 | Tagato | 340/572.7 |
| 2007/0279231 A1 | 12/2007 | Cheng et al. | |
| 2008/0054638 A1* | 3/2008 | Greene et al. | 290/1 R |
| 2008/0055092 A1 | 3/2008 | Burr | |
| 2008/0080214 A1 | 4/2008 | Umeda et al. | |
| 2009/0115574 A1* | 5/2009 | Tien et al. | 340/10.1 |
| 2009/0117872 A1* | 5/2009 | Jorgenson et al. | 455/334 |
| 2009/0140860 A1 | 6/2009 | Forster | |
| 2009/0184838 A1* | 7/2009 | Jeon et al. | 340/686.1 |
| 2009/0289771 A1* | 11/2009 | Tuttle | 340/10.3 |
| 2010/0148926 A1* | 6/2010 | Kang et al. | 340/10.1 |
| 2010/0148965 A1* | 6/2010 | Alexis et al. | 340/572.1 |
| 2010/0194534 A1* | 8/2010 | Kunc et al. | 340/10.1 |
| 2011/0025506 A1* | 2/2011 | Smith et al. | 340/572.7 |
| 2011/0273273 A1* | 11/2011 | Liu | 340/10.1 |
| 2012/0268327 A1* | 10/2012 | Sardariani et al. | 343/700 MS |
| 2012/0319821 A1* | 12/2012 | Karttaavi et al. | 340/10.1 |
| 2013/0035047 A1* | 2/2013 | Chen et al. | 455/79 |
| 2013/0176115 A1* | 7/2013 | Puleston et al. | 340/10.51 |

OTHER PUBLICATIONS

Non-Final Office Action for U.S. Appl. No. 12/483,842, filed Jun. 12, 2009, mailed on Jan. 27, 2014.
Office Action received for U.S. Appl. No. 13/651,109, mailed Jan. 12, 2015 and filed Oct. 12, 2012.
Final Office Action received for U.S. Appl. No. 12/483,842, mailed Oct. 16, 2014 and filed Jun. 12, 2009.
Non-Final Office Action for U.S. Appl. No. 12/483,842, filed Jun. 12, 2009, mailed on Oct. 9, 2012.
Final Office Action for U.S. Appl. No. 12/483,842, filed Jun. 12, 2009, mailed on Apr. 10, 2013.
Final Office Action for U.S. Appl. No. 12/483,842, filed Jun. 12, 2009, mailed on Oct. 16, 2014.

* cited by examiner

*RFID SYSTEM*

*RFID TAG*

*SIGNAL PATH DURING R→T*

*SIGNAL PATH DURING T→R*

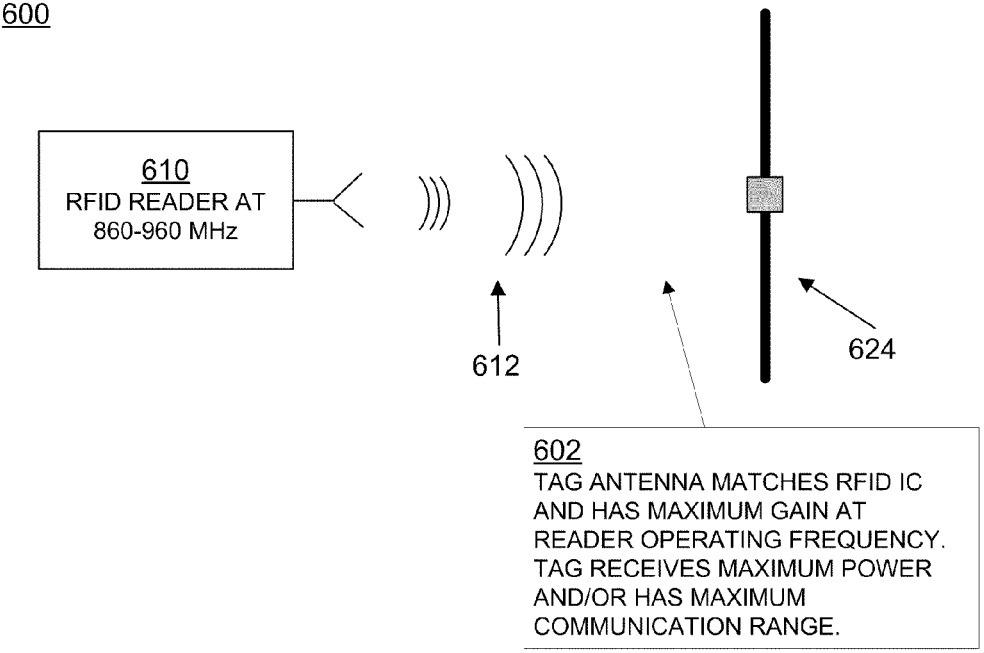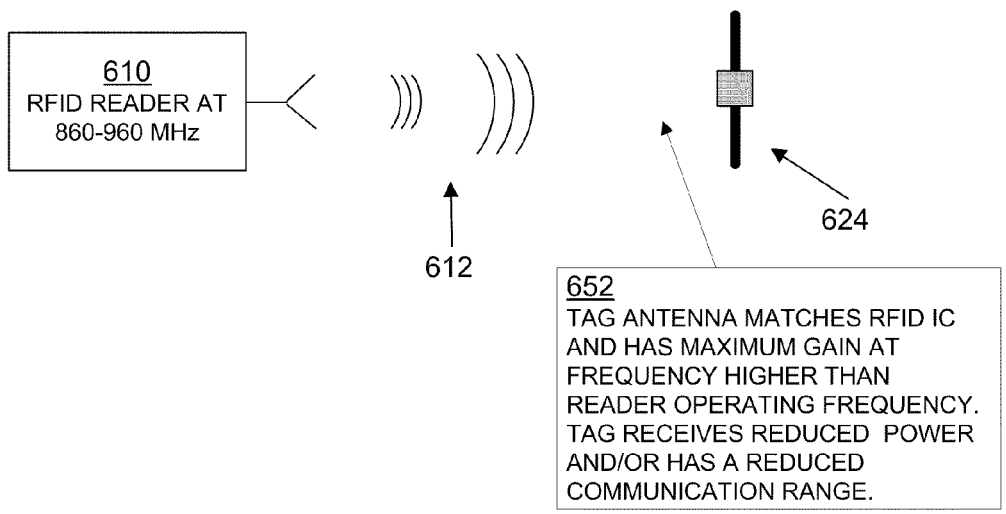
FIG. 6   *EFFECT OF MISMATCH BETWEEN ANTENNA AND RF FREQUENCY*

IDEALIZED DUAL-ANTENNA TAG OPERATES AT THE
FREQUENCY OF EACH READER

REPRESENTATIVE SMALL DUAL-
DIFFERENTIAL TAG WITH ANTENNAS
OPERATING AT DIFFERENT FREQUENCIES

DUAL-FREQUENCY RFID TAG WITH ISOLATED INPUTS

CROSS REFERENCE TO RELATED APPLICATIONS

This application is a continuation-in-part of U.S. patent application Ser. No. 12/483,842, filed Jun. 12, 2009, which is hereby incorporated by reference for all purposes.

BACKGROUND

Radio Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave may be far field, in which the electric- and magnetic-field components of the underlying electromagnetic field have an amplitude ratio that depends on the propagating medium. The RF wave may alternatively be near field, in which one of the electric or magnetic field components can be dominant.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In some RFID tags the power management section includes an energy storage device, such as a battery. RFID tags with an energy storage device are known as active or battery-assisted tags. Advances in semiconductor technology have miniaturized the electronics sufficiently that an RFID tag can be powered solely by the RF signal it receives. Such RFID tags do not include an energy storage device such as a battery, and are called passive tags. Regardless of the type, all tags typically store or buffer some energy temporarily in passive storage devices such as capacitors.

Many parameters of RFID communications such as the amount of energy that a tag can extract from an electromagnetic field, the tag's communication data rate with a reader, the communications protocol, the maximum range of the communications, the tag antenna performance relative to its orientation in the electromagnetic field, and the scattering and interference environment, vary with frequency. In some instances it may be desirable for an RFID tag to operate at multiple frequency ranges sequentially or simultaneously. In other instances it may be desirable for an RFID tag to operate at one frequency range while extracting energy from an electromagnetic field at a different frequency range. In yet other instances it may be desirable for an RFID tag to operate at one frequency range while monitoring another frequency range.

BRIEF SUMMARY

This summary introduces a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an Integrated Circuit (IC) for an RFID tag, and an RFID tag including such an IC, where the IC includes at least two antenna ports for connecting to at least two antennas, with the antenna ports electrically isolated from each other. In some embodiments the antennas are tuned to operate at substantially different frequency ranges. In other embodiments the two antenna ports are operable to demodulate symbols according to two different protocols. In yet other embodiments the two antenna ports are configured to operate simultaneously.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying Drawings, in which:

FIG. 6 illustrates the effects of matching a tag antenna to the RF frequency of the reader.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
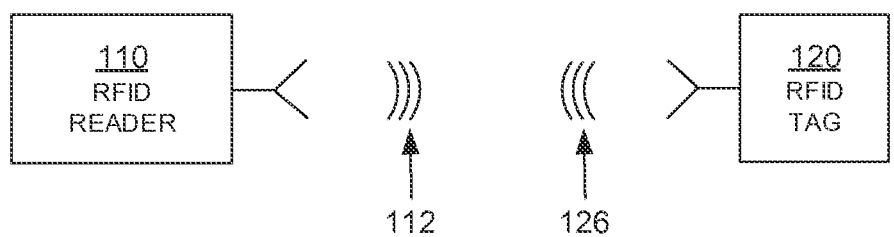
FIG. 1 is a block diagram of components of an RFID system.

FIG. 1 is a diagram of components of a typical RFID system 100, incorporating embodiments. An RFID reader 110 transmits an interrogating Radio Frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Encoding the data can be performed in a number of ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the symbols are processed internally by reader 110 and tag 120, they can be equivalently considered and treated as numbers having corresponding values, and so on.

Tag 120 can be a passive tag, or an active or battery-assisted tag (i.e., having its own power source). Where tag 120 is a passive tag, it is powered from wave 112.

Figure 2:
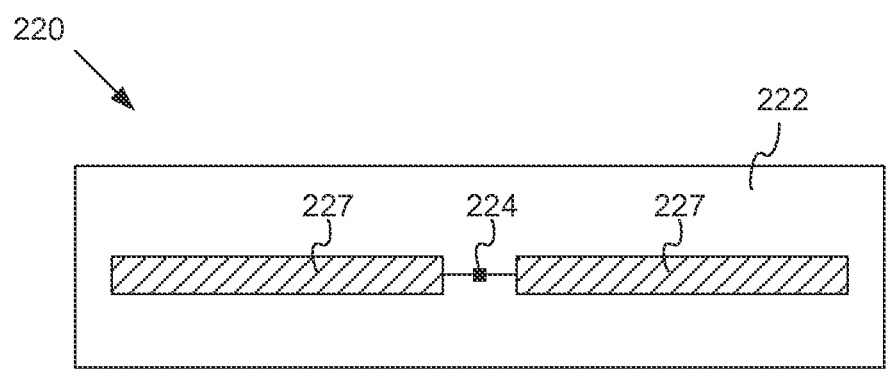
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active and battery-assisted tags.

Tag 220 is formed on a substantially planar inlay 222, which can be made in many ways known in the art. Tag 220 includes an electrical circuit which is preferably implemented as an integrated circuit (IC) 224. IC 224 is arranged on inlay 222.

Tag 220 also includes an antenna for exchanging wireless signals with its environment. The antenna is often flat and attached to inlay 222. IC 224 is electrically coupled to the antenna via suitable antenna terminals (not shown in FIG. 2).

IC 224 is shown with a single antenna port, comprising two antenna terminals coupled to two antenna segments 227 which are shown here forming a dipole. Many other embodiments are possible using any number of ports, terminals, antennas, and/or segments of antennas.

In operation, a signal is received by the antenna and communicated to IC 224. IC 224 both harvests power, and responds if appropriate, based on the incoming signal and the IC's internal state. In order to respond by replying, IC 224 modulates the reflectance of the antenna, which generates backscatter 126 from wave 112 transmitted by the reader. Coupling together and uncoupling the antenna terminals of IC 224 can modulate the antenna's reflectance, as can a variety of other means.

In the embodiment of FIG. 2, antenna segments 227 are separate from IC 224. In other embodiments, antenna segments may alternatively be formed on IC 224, and so on.

The components of the RFID system of FIG. 1 may communicate with each other in any number of modes. One such mode is called full duplex. Another such mode is called half-duplex, and is described below.

Figure 3:
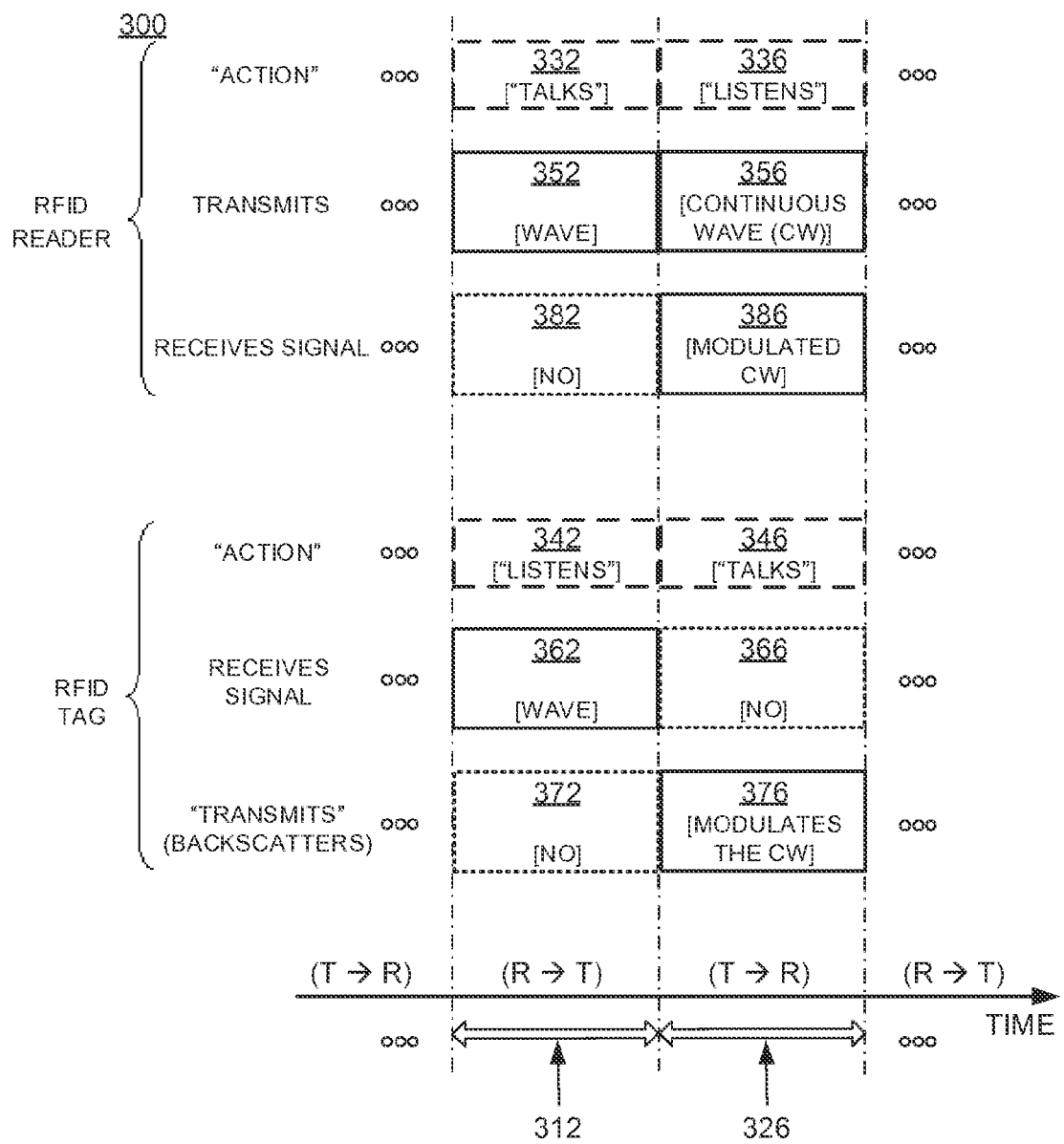
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
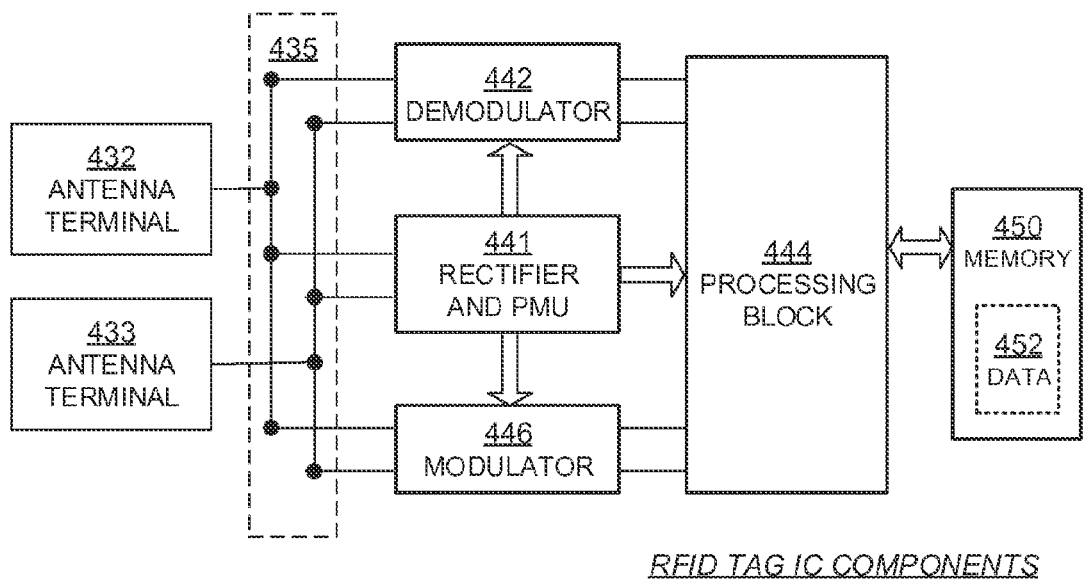
FIG. 4 is a block diagram showing a detail of an RFID tag, such as the one shown in FIG. 1.

FIG. 4 is a block diagram showing a detail of an RFID IC, such as the one shown in FIG. 2. Electrical circuit 424 in FIG. 4 may be formed in an IC of an RFID tag, such as IC 224 of FIG. 2. Circuit 424 has a number of main components that are described in this document. Circuit 424 may have a number of additional components from what is shown and described, or different components, depending on the exact implementation.

Circuit 424 shows two antenna terminals 432, 433, which are suitable for coupling to antenna segments such as segments 227 of RFID tag 220 of FIG. 2. When two antenna terminals form a signal path with an antenna they are often referred-to as an antenna port. Antenna terminals 432, 433 may be made in any suitable way, such as using pads and so on. In many embodiments more than two antenna terminals are used, especially when more than one antenna port or more than one antenna is used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Rectifier and PMU (Power Management Unit) 441. Rectifier and PMU 441 may be implemented in any way known in the art, for harvesting raw RF power received via antenna terminals 432, 433. In some embodiments, block 441 may include more than one rectifier.

In operation, an RF wave received via antenna terminals 432, 433 is received by Rectifier and PMU 441, which in turn generates power for the electrical circuits of IC 424. This is true for either or both reader-to-tag (R→T) and tag-to-reader (T→R) sessions, whether or not the received RF wave is modulated.

Circuit 424 additionally includes a demodulator 442. Demodulator 442 demodulates an RF signal received via antenna terminals 432, 433. Demodulator 442 may be implemented in any way known in the art, for example including an attenuator stage, an amplifier stage, and so on.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on.

Circuit 424 additionally includes a modulator 446. Modulator 446 modulates an output signal generated by processing block 444. The modulated signal is transmitted by driving antenna terminals 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 452. Memory 450 is preferably implemented as a Nonvolatile Memory (NVM), which means that data 452 is retained even when circuit 424 does not have power, as is frequently the case for a passive RFID tag.

In terms of processing a signal, circuit 424 operates differently during a R→T session and a T→R session. The different operations are described below, in this case with circuit 424 representing an IC of an RFID tag.

Figure 5A:
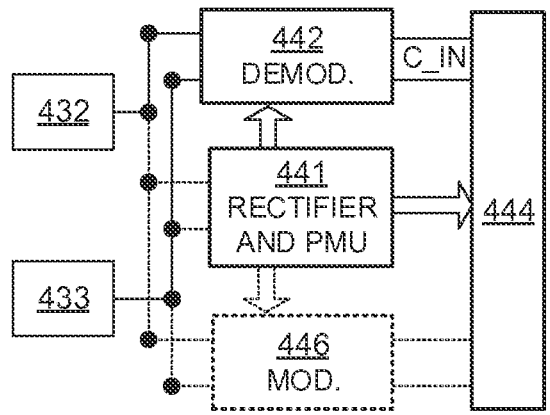
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session (receive mode of operation) during time interval 312 of FIG. 3. An RF wave is received from antenna terminals 432, 433, and then a signal is demodulated from demodulator 442, and then input to processing block 444 as C_IN. In one embodiment, C_IN may include a received stream of symbols.

Version 524-A shows as relatively obscured those components that do not play a part in processing a signal during a R→T session. Indeed, Rectifier and PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
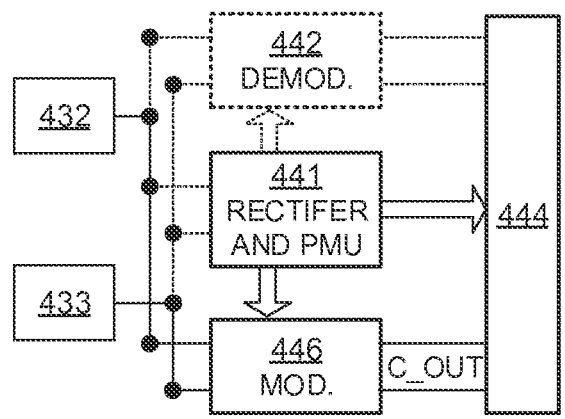

FIG. 5B shows version 524-B of components of circuit 424 of FIG. 4, further modified to emphasize a signal operation during a T→R session during time interval 326 of FIG. 3. A signal is output from processing block 444 as C_OUT. In one embodiment, C_OUT may include a transmission stream of symbols. C_OUT is then modulated by modulator 446, and output as an RF wave via antenna terminals 432, 433.

Version 524-B shows as relatively obscured those components that do not play a part in processing a signal during a T→R session. Indeed, Rectifier and PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

In typical embodiments demodulator 442 and modulator 446 are operable to demodulate and modulate signals according to a protocol, such as Version 1.2.0 of the Class-1 Generation-2 UHF RFID Protocol for Communications at 860 MHz-960 MHz ("Gen2") by EPCglobal, Inc., which is hereby incorporated by reference. In embodiments where electrical circuit 424 includes multiple demodulators and/or multiple modulators, each may be configured to support different protocols or different sets of protocols. A protocol represents, in part, how symbols are encoded for communication, and may include a set of modulations, encodings, rates, timings, or any suitable parameters associated with data communications.

FIG. 6 illustrates the effect of mismatch between a tag antenna and a reader operating frequency. As shown in diagram 600, if the gain and reflection efficiency of tag antenna 624 are tuned (also known as matched) to the frequency of signal 612 transmitted by reader 610 then many operational parameters such as the tag's communications range and power-harvesting ability are higher than the situation in diagram 650, where tag antenna 624 is not tuned to the frequency of signal 612.

Figure 7:
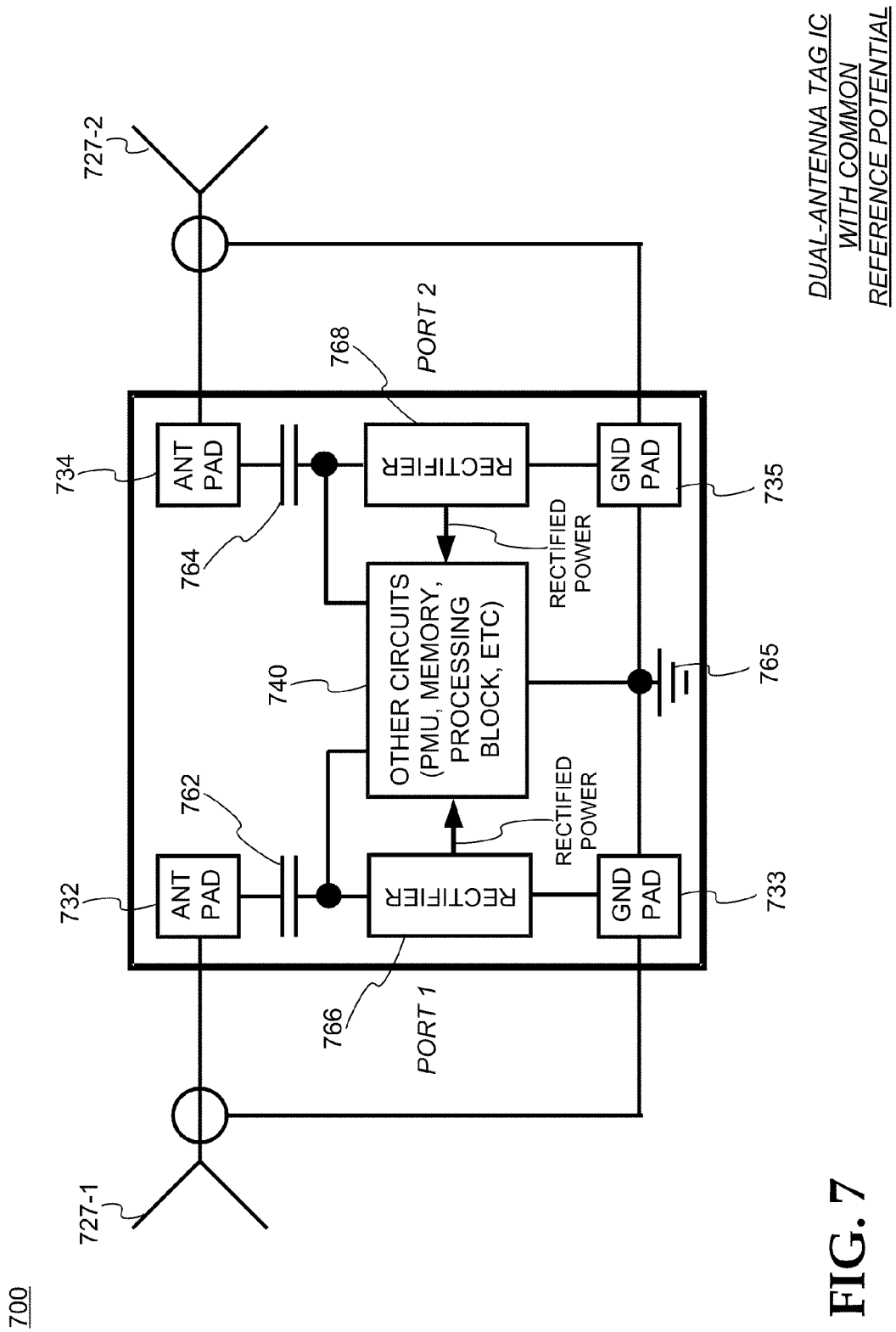
FIG. 7 is a block diagram illustrating a dual-antenna RFID IC with common reference potential.

FIG. 7 is a block diagram 700 illustrating a dual-port tag IC with common reference potential. The IC shown in diagram 700 includes two ports defined by antenna terminals (pads) 732, 733 (port 1) and 734, 735 (port 2), respectively, for connection to two antennas 727-1 and 727-2. One or both of the antennas coupled to rectifiers 766 and 768 can provide power for tag operations. Two of the terminals, one for each of port 1 and port 2, are capacitively coupled to their respective rectifiers through capacitors 762 and 764. In conventional dual-antenna tag designs, a shared reference potential 765 (often the IC reference potential, commonly referred to as ground) is coupled to the other two of the terminals (e.g. 733 and 735). Other circuits 740 of the tag may be coupled to these terminals as well, for example a demodulator for symbol demodulation.

Figure 8:
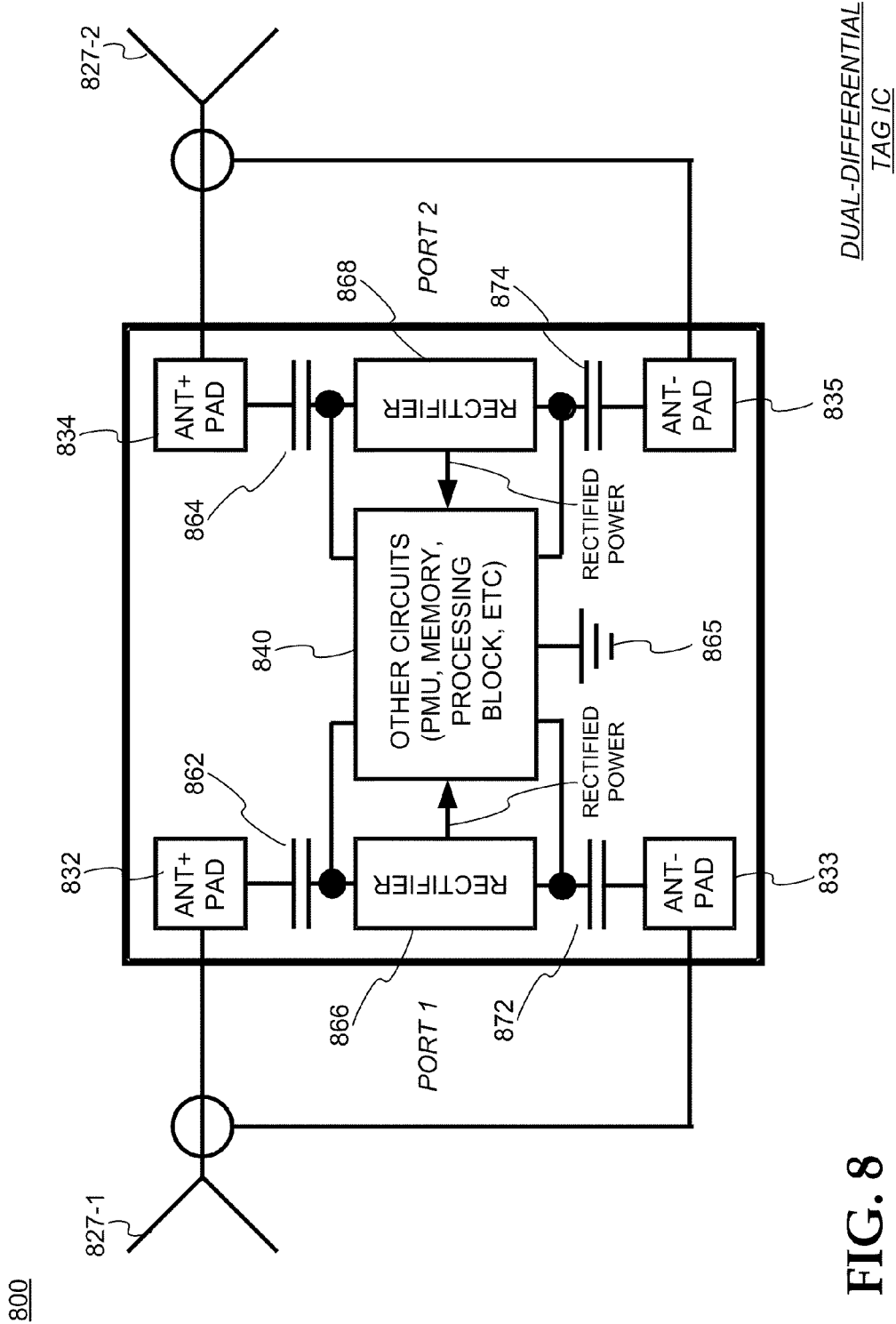
FIG. 8 illustrates a dual-differential RFID IC with electrically isolated antenna ports according to one embodiment.

FIG. 8 illustrates a dual-differential RFID tag IC with electrically isolated antenna ports according to one embodiment. The IC shown in diagram 800 includes antenna terminals (pads) 832 and 833 (port 1) coupled to antenna 827-1, and antenna terminals (pads) 834 and 835 (port 2) coupled to antenna 827-2. Rectifiers 866 and 868 rectify the electromagnetic energy incident on the antennas to power the tag circuits 840. Tag circuits 840 may be coupled to a reference potential 865.

Differently from the IC of FIG. 7, all four terminals (pads 832-835 of IC 800) are capacitively coupled to the rectifiers through capacitors 862, 872, 864, and 874, and none are directly coupled to each other or to the tag reference potential 865. By severing the on-chip connection that tied two of the terminals together (one each from port 1 and port 2), the two ports become electrically isolated, and the two antennas 827-1 and 827-2 likewise become electrically isolated. The two antennas can float electrically relative to each other and to the other circuits on the IC, and can develop different potentials across them. By convention, two ports are said to be electrically isolated if an odd-mode excitation of one port results in substantially no odd-mode coupling to the other port.

Coupling capacitors 862, 872, 864, and 874 further facilitate the electrical isolation between the ports that is achieved by severing the connections between the IC terminals and the reference potential by allowing the IC terminals to develop DC potentials that are different from the rectifier input potentials.

The port configuration in IC 800, exhibiting mirror-image symmetry about a single axis, is referred to as an "H" configuration for dual-differential tags. The tag is called "dual-differential" because it has dual ports each of which accepts a differential input isolated from the other.

Figure 9:
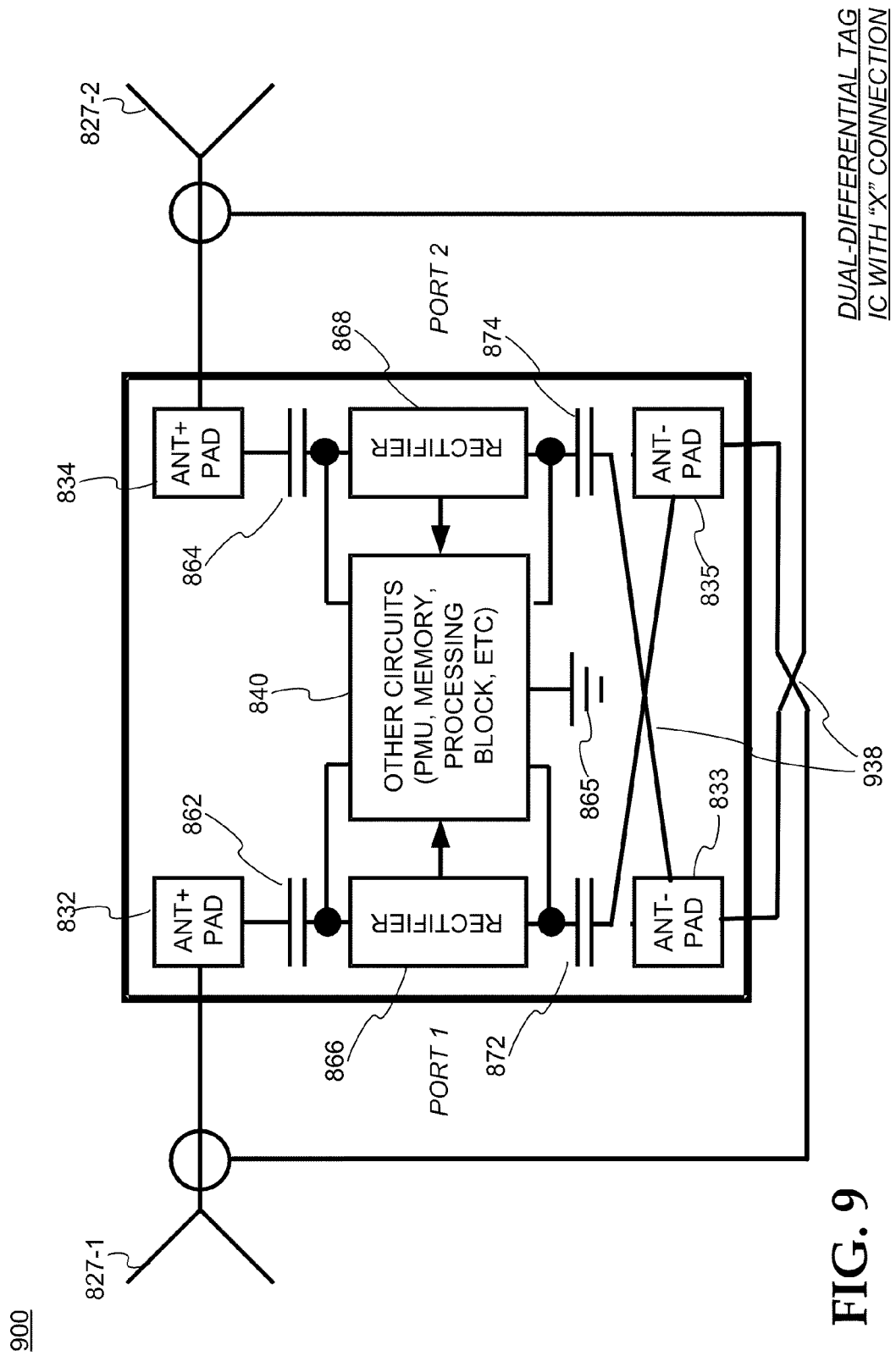
FIG. 9 illustrates another dual-differential RFID IC with cross-connected electrically isolated antenna ports according to another embodiment.

FIG. 9 illustrates another dual-differential tag IC with electrically isolated and cross-connected antenna ports according to another embodiment. The components and the functionality of the IC displayed in diagram 900 are similar to those numbered likewise in diagram 800 of FIG. 8.

Differently from the IC of diagram 800, terminals 833 and 835 of the IC in diagram 900 are cross-coupled (938) to their respective antennas and capacitors (e.g. antenna 827-1 to terminal 835 to capacitor 872). This configuration is referred to as an "X" configuration.

Modern wireless devices operate in a number of frequency ranges. For example, WiFi and Bluetooth operate in the 2.4000-2.4835 GHz range. WiFi also operates in the 4.915-5.825 GHz range. GPS operates at 1575.42 and 1227.60 MHz. GSM/UMTS/LTE cellular protocols operate in the 698-716, 728-746, 746-756, 758-768, 777-787, 788-798, 791-821, 815-845, 824.2-849.2, 832-862, 860-890, 869.2-894.2, 876-915, 921-960, 1427.9-1462.9, 1475.9-1510.9, 1710.2-1784.8, 1805.2-1879.8, 1850-1910, 1850.2-1910.2, 1880-1920, 1900-1920, 1920-1980, 1930-1990, 1930.2-1990.2, 2010-2025, 2110-2170, 2300-2400, 2496-2690, 2500-2570, 2570-2620, and 2620-2690 MHz frequency ranges, North American broadcast television operates in the 54-806 MHz range. UHF RFID operates from 860-960 MHz. HF and near-field RFID operate at 13.56 MHz. LF RFID operates at 125 kHz.

RFID tags capable of operating both in an RFID band, such as 860-960 MHz, and at one or more different frequencies enables many applications. For example, a UHF RFID tag that can also communicate with cellular, WiFi, GPS or other protocols in their respective frequency ranges extends the functionality of the tag. Indeed, even enabling the tag to merely extract RF energy from other frequencies while receiving commands at an RFID frequency can extend the tag's operating range for RFID communications.

To enable such multi-frequency operation, conventional RFID tags may use a single broadband antenna coupled to an RFID integrated circuit (IC) comprising a single antenna port and broadband communications circuitry, or may use two or more antennas tuned to different frequency ranges and coupled to corresponding two or more antenna ports with switches that allow the IC to select from among the ports. In conventional multi-port RFID ICs the antenna ports may share a reference potential within the IC. Unfortunately, this sharing means that the antennas likewise share a common reference potential, which can degrade their performance. Furthermore, sharing a reference potential can degrade the performance of the communications circuitry within the RFID IC itself.

According to embodiments, one mechanism for enabling multi-frequency operation without the disadvantages of sharing a common reference potential is to couple an antenna for the RFID band to one electrically isolated antenna port, and to couple another antenna for a different band or service to another electrically isolated antenna port.

Figure 10A:
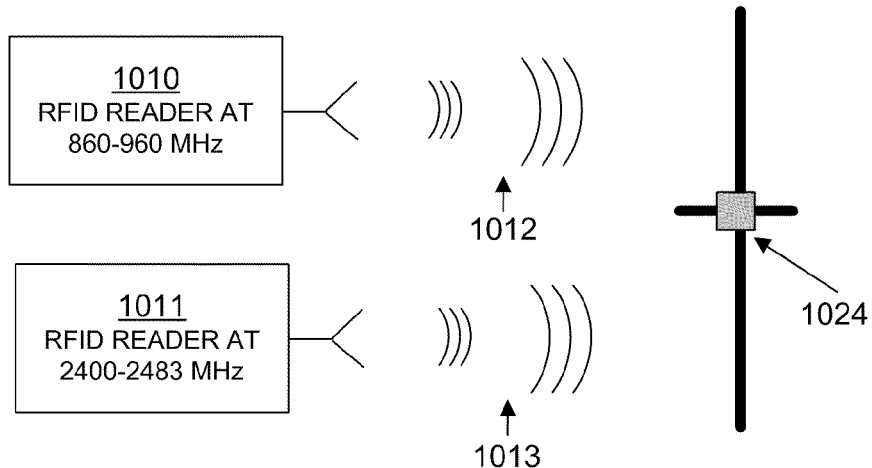
FIGS. 10A and 10B illustrate dual-differential tags having multiple antennas, each tuned to a different frequency range.
Figure 10B:
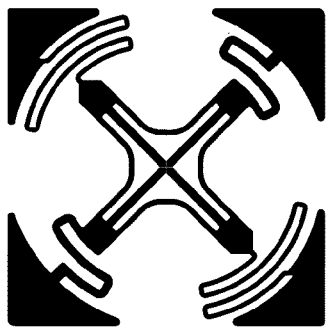

FIGS. 10A-B illustrate dual-differential tags with dual antennas for receiving signals at two frequency ranges. Diagram 1000 shows tag 1024 with two dipole antennas configured to receive signals from reader 1010 at 860-960 MHz (1012) and from reader 1011 at 2400-2483 MHz (1013). The dual antennas improve many tag operating parameters such as communication range and power-harvesting ability at the two frequency ranges. Diagram 1050 also shows an RFID tag with dual antennas operable at different frequency ranges. As described above the two frequency ranges may allow a mix of protocols, or one may be used for power harvesting, or both may be used for RFID at different frequencies. As described in conjunction with diagram 220, the antennas may be formed on a common substrate (e.g., on the same tag). Alternatively, they may be formed on different substrates and electrically connected to the RFID IC. In some embodiments an antenna configured to operate at a particular frequency or frequency range may be formed from a portion of a different antenna configured to operate at a different frequency or frequency range. For example, a higher-frequency antenna may be formed from a portion of a lower-frequency antenna, because higher-frequency antennas tend to be smaller than lower-frequency antennas. In some embodiments, tags and antennas may be configured to operate in different mediums such as oil, water, etc. where the relationship between the frequency and wavelength of the RF wave is different than it is for air.

Tag antennas according to embodiments may be designed in any form and are not limited to dipoles. For example, tag antennas may be a patch, a slot, a dipole, a loop, a coil, a horn, a spiral, or any other suitable antenna. Furthermore, according to embodiments the coupling capacitors, if any, may be located on or off the IC, may have suitable capacitance values, and may be selected based on parameters such as substrate type, fabrication methods, antenna type, circuit performance, and other circuit and capacitor characteristics.

Embodiments may also include methods of manufacturing a tag as described herein. These methods may be performed in conjunction with one or more human operators. These human operators need not be collocated with each other, and each can be with a machine that performs a portion of the manufacturing.

Embodiments for manufacturing a tag as described herein may additionally include programs, and methods of operation of the programs. A program is generally defined as a group of steps or operations leading to a desired result, due to the nature of the elements in the steps and their sequence.

Performing the steps, instructions, or operations of a program as discussed above requires manipulation of physical quantities. Usually, though not necessarily, these quantities may be transferred, combined, compared, and otherwise manipulated or processed according to the steps or instructions, and they may also be stored in a machine-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Programs for manufacturing a tag according to embodiments may furthermore include storage media. Such media, individually or in combination with others, have stored thereon instructions of a program made according to the embodiments. A storage medium according to the embodiments is a machine-readable medium such as a memory, and is read by a processor of the type mentioned above. If a memory, it can be implemented in a number of ways, such as Read Only Memory (ROM), Random Access Memory (RAM), etc., some of which are volatile and some nonvolatile.

Even though it is said that the program may be stored in a machine-readable medium, it should be clear to a person skilled in the art that it need not be a single memory, or even a single machine. Various portions, modules or features of it may reside in separate memories, or even separate machines.

Often, for the sake of convenience only, it is desirable to implement and describe a program for manufacturing a tag according to embodiments as software. The software can be unitary, or thought in terms of various interconnected distinct software modules.

Embodiments of an RFID tag as described herein can be implemented as hardware, software, firmware, or any combination thereof. It is advantageous to consider such a tag as subdivided into components or modules. A person skilled in the art will recognize that some of these components or modules can be implemented as hardware, some as software, some as firmware, and some as a combination.

According to one embodiment, an IC for an RFID tag configured to communicate with an RFID reader includes electrical circuits, a reference potential for the electrical circuits, four antenna terminals, a first port comprising two of the antenna terminals, a second port comprising a different two of the antenna terminals, and in which the first port and the second port are electrically isolated. All four of the antenna terminals may be unconnected to the reference potential, and the pairing of the antenna terminals may be in an X or H configurations. In some embodiments a first antenna configured to operate at a first frequency range is coupled to the first port, and a second antenna configured to operate at a second frequency range substantially different from the first is coupled to the second antenna port. Set theory language can describe the relationships between the two frequency ranges: In some embodiments the two frequency ranges are disjoint (non-overlapping or non-intersecting); in other embodiments the first frequency range may extend into or intersect with the second; in yet other embodiments the first frequency range may be narrower than and contained by the wider second frequency range as a proper subset.

A near-field antenna may be coupled to the first port and a far-field antenna may be coupled to the second. Alternatively, far-field antennas or near-field antennas may be coupled to each of the ports. In some embodiments, a single segmented antenna may be coupled to more than two of the antenna terminals.

In some embodiments the IC may include two or more rectifiers. Multiple rectifiers may be coupled to adjacent antenna terminals, non-adjacent antenna terminals, or to a mix of adjacent and non-adjacent terminals. In some embodiments some or all of the antenna terminals are capacitively coupled to the rectifiers. Other embodiments may use conductive or inductive coupling, or a mix of capacitive, conductive, and inductive coupling. The IC may include more than four antenna terminals, more than two ports, and more than two antennas.

The rectifiers may be coupled to other circuits of the IC, which may include a power management unit, a processor, and/or a memory, where the other circuits are coupled to the reference potential. The reference potential may be further coupled to a semiconductor substrate of the IC.

Embodiments for an IC of an RFID tag may include at least two antenna ports defined by respective pairs of antenna terminals for connecting to at least two respective antennas, the antennas operable at different frequencies, and at least two rectifiers. The antennas may be capacitively coupled to the rectifiers. The capacitive coupling may be achieved through distributed capacitance disposed in a substrate of the IC, by lumped capacitances disposed in conductive layers of the IC, by metal-oxide semiconductor (MOS) capacitors disposed in the IC, by an intrinsic input capacitance of a rectifier itself, by capacitive elements disposed external to the IC, by capacitances intrinsic to the antennas, or by other means as will be well known to those skilled in the art. Embodiments may include an RFID tag with an IC as described above and at least two antennas coupled to the antenna ports.

Figure 11:
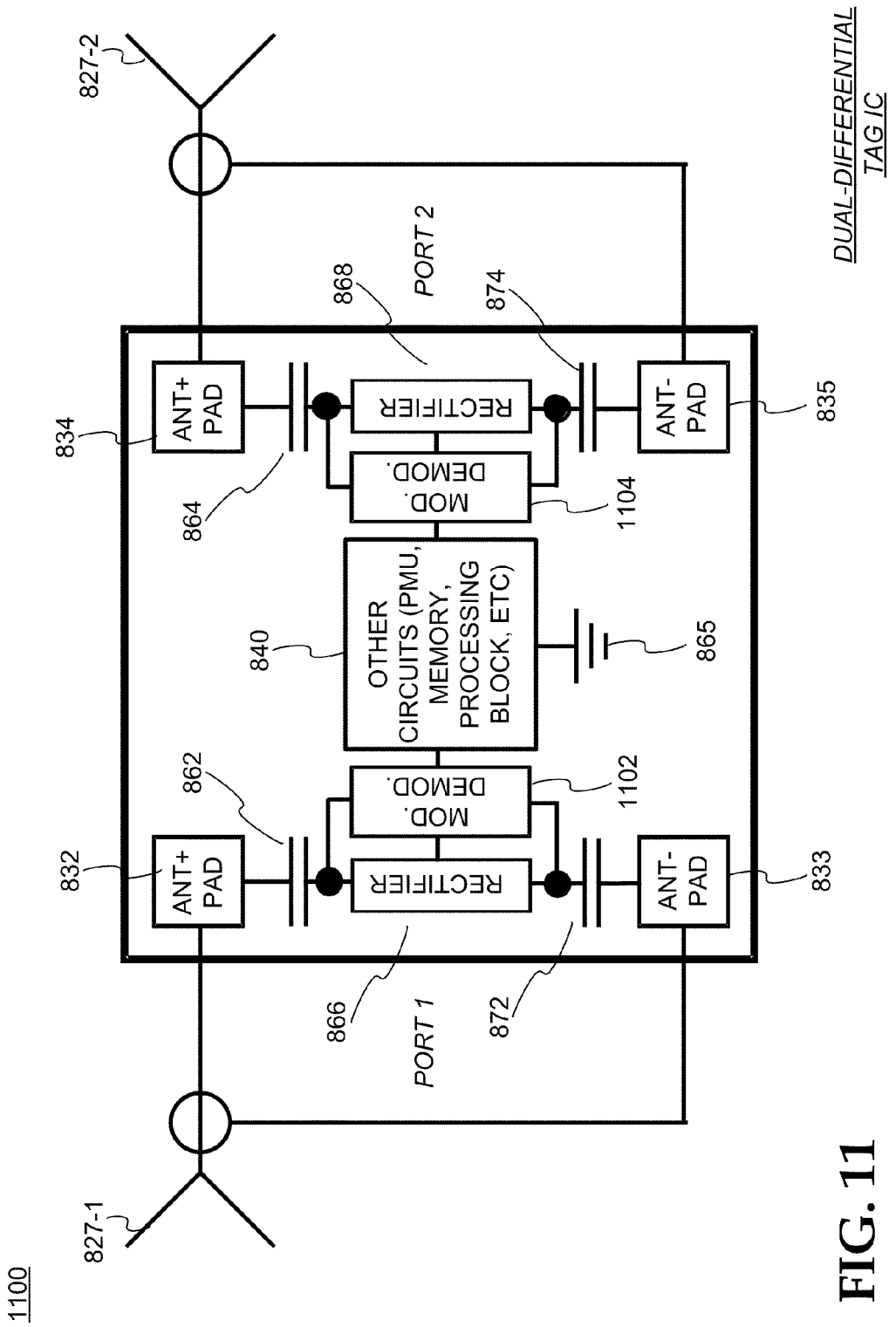
FIG. 11 illustrates a dual-differential RFID IC with electrically isolated antenna ports according to another embodiment.

FIG. 11 illustrates a dual-differential tag IC 1100 with electrically isolated antenna ports according to embodiments. IC 1100 is similar to IC 800, described above in relation to FIG. 8. IC 1100 includes modulator/demodulators 1102 and 1104, each of which may include a modulator similar to modulator 446 and a demodulator similar to demodulator 442, both shown in FIG. 4. In IC 1100 modulator/demodulator 1102 is connected to antenna 827-1 via port 1, and modulator/demodulator 1104 is connected to antenna 827-2 via port 2. If antennas 827-1 and 827-2 are configured to operate at different frequencies or in different frequency ranges then the modulator/demodulator associated with the antenna may be likewise configured to operate at the corresponding frequency or in the corresponding frequency range. In some embodiments, instead of each antenna being connected to a different modulator and/or demodulator, multiple antennas may be connected to a single modulator and/or demodulator as long as electrical isolation between the ports is preserved. As one example, antennas 827-1 and 827-2 may be connected to a single modulator and/or a single demodulator. In some embodiments the two antenna ports, and the circuitry attached to them, are configured to operate simultaneously.

Figure 12:
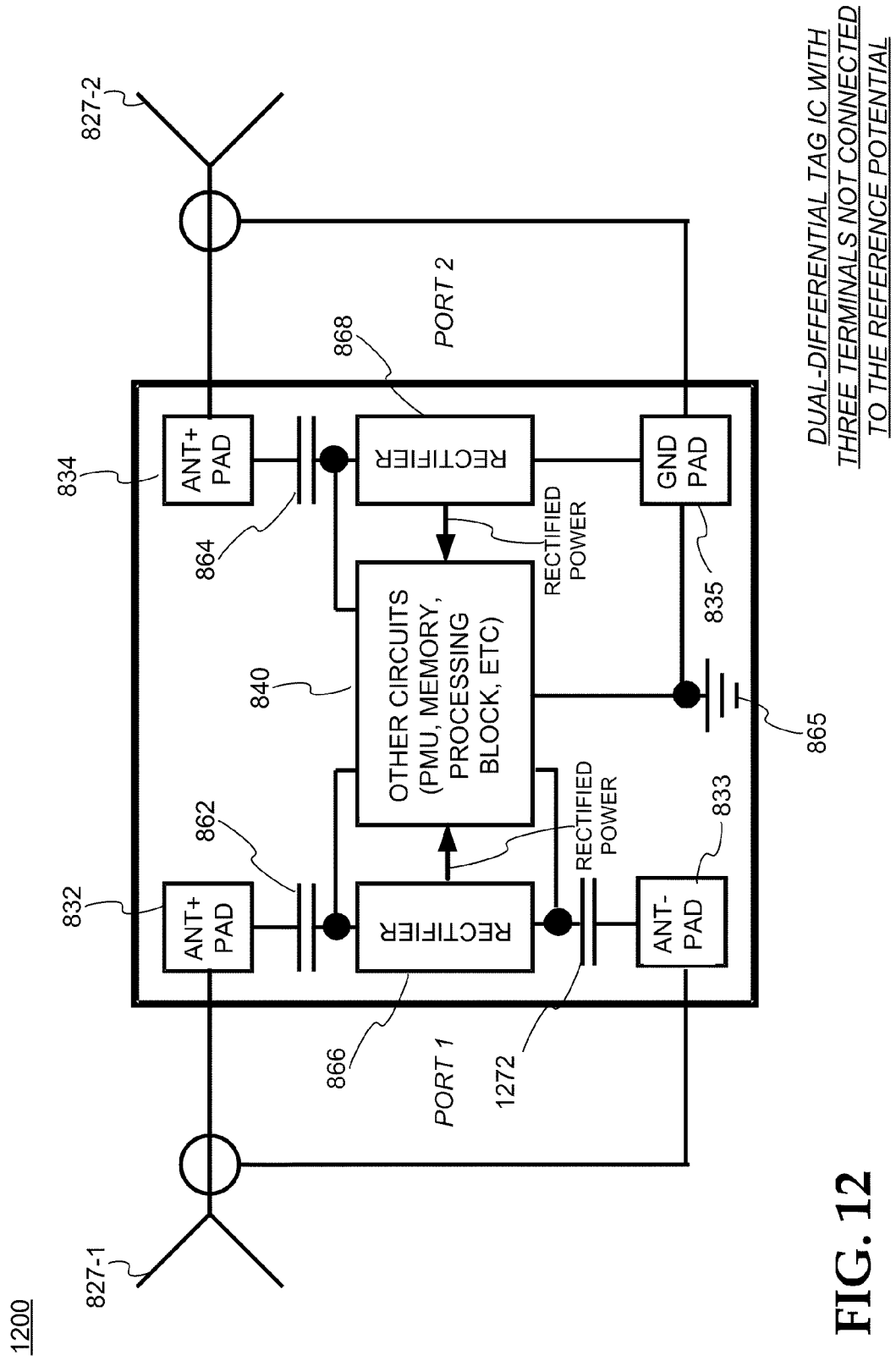
FIG. 12 illustrates a further dual-differential RFID IC with electrically isolated antenna ports according to a further embodiment.

FIG. 12 illustrates a dual-differential tag IC with electrically isolated antenna ports according to embodiments. The tag IC shown in diagram 1200 includes antenna terminals 832 and 833 (port 1) coupled to antenna 827-1, and antenna terminals 834 and 835 (port 2) coupled to antenna 827-2. Rectifiers 866 and 868 rectify the electromagnetic energy incident on the antennas to power tag circuits 840. Tag circuits 840 may be coupled to a reference potential 865.

Differently from the IC of diagram 800, the IC in diagram 1200 has only three of its four antenna terminals (832, 833, and 834) capacitively coupled to the rectifiers, and only three of its four antenna terminals (832, 833, and 834) not connected to the reference potential 865. Antenna terminal 835 (also referred to as a ground pad) is coupled to rectifier 866 and to reference potential 865. This configuration still isolates port 1 from port 2 electrically, but does not isolate port 2 from the electrical circuits of the IC. Regardless, antennas 827-1 and 827-2 may still act independently. As will be obvious to those skilled in the art, other embodiments are possible, such as ground pad 835 connected to reference potential 865 but capacitively coupled to rectifier 866.

Figure 13:
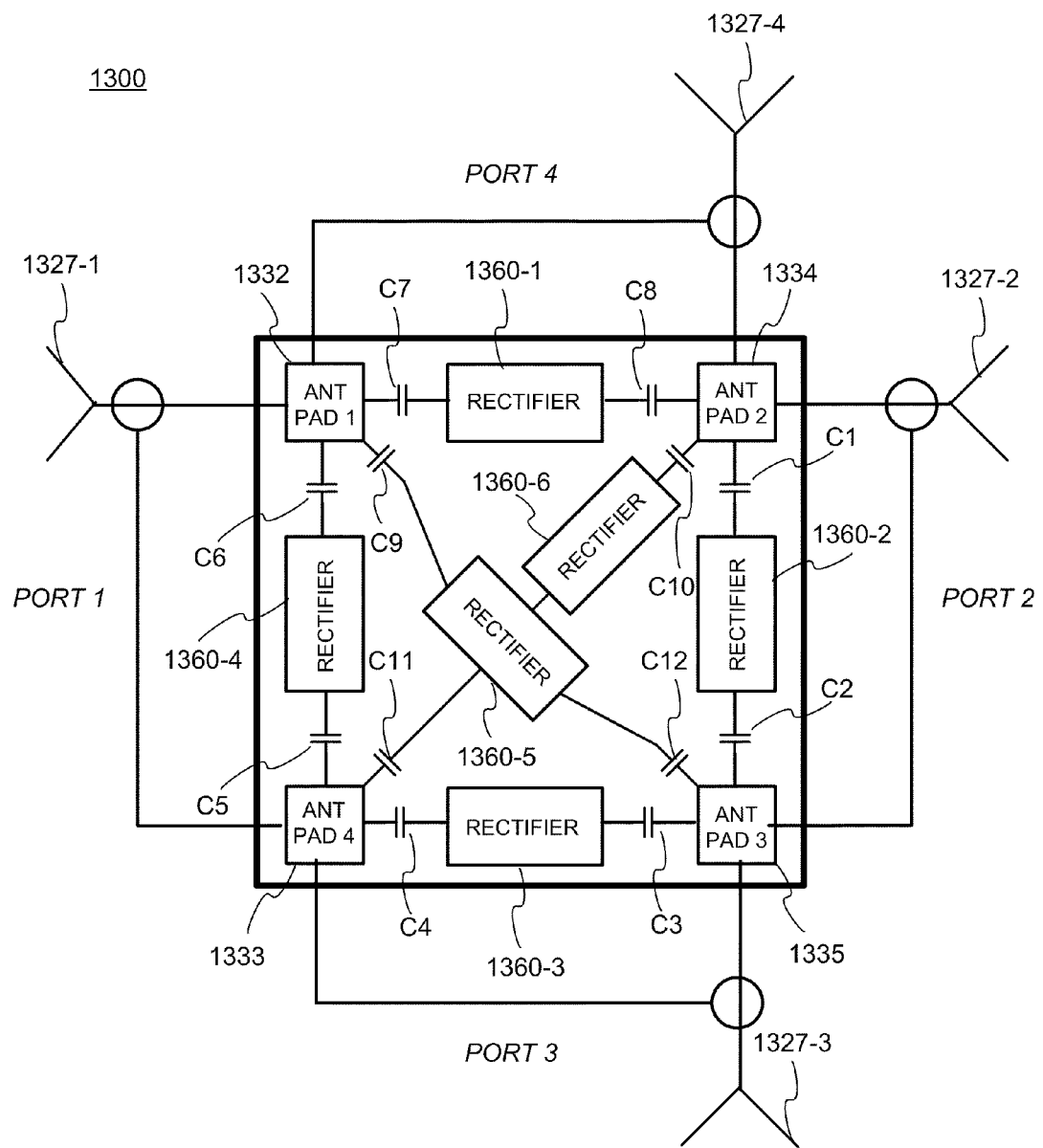
FIG. 13 illustrates an example four antenna RFID IC with electrically isolated antenna ports according to yet another embodiment.

Diagram 1300 of FIG. 13 illustrates an example four antenna tag IC containing six rectifiers according to yet another embodiment. The IC shown in diagram 1300 includes six electrically isolated antenna ports with each antenna port defined by two respective antenna terminals for connection to respective antennas. Antenna terminals 1332 and 1333 constitute port 1 connecting to antenna 1327-1, antenna terminals 1334 and 1335 constitute port 2 connecting to antenna 1327-2, antenna terminals 1333 and 1335 constitute port 3 connecting to antenna 1327-3, and antenna terminals 1332 and 1334 constitute port 4 connecting to antenna 1327-4. Furthermore, antenna terminals 1332 and 1335, and also 1333 and 1334, also constitute two respective ports through the diagonally positioned rectifiers 1360-5 and 1360-6 (not labeled with port numbers in FIG. 13).

The rectifiers in diagram 1300 are configured as follows: rectifier 1360-1 is between antenna terminals 1332 and 1334, each of which are capacitively coupled to the rectifier by capacitors C7 and C8; rectifier 1360-2 is between antenna terminals 1334 and 1335, each of which are capacitively coupled to the rectifier by capacitors C1 and C2; rectifier 1360-3 is between antenna terminals 1335 and 1333, each of which are capacitively coupled to the rectifier by capacitors C3 and C4; rectifier 1360-4 is between antenna terminals 1333 and 1332, each of which are capacitively coupled to the rectifier by capacitors C5 and C6; rectifier 1360-6 is between antenna terminals 1333 and 1334, each of which are capacitively coupled to the rectifier by capacitors C10 and C11; and rectifier 1360-5 is between antenna terminals 1332 and 1335, each of which are capacitively coupled to the rectifier by capacitors C9 and C12.

In the configuration of diagram 1300, the rectifiers can convert power incident on any port, and the IC is sensitive to both odd-mode and even-mode excitation of its ports. Moreover, the IC can be placed in any position on the antennas. Thus, the IC of diagram 1300 represents a complete, symmetric configuration. As will be obvious to those skilled in the art, it is possible to configure an IC with fewer ports than shown in diagram 1300, or with even more antenna terminals and more ports.

For clarity, other tag circuits are not shown in diagram 1300 of FIG. 13. As with the previous example embodiments, the rectifiers, ports, and antennas according to embodiments may be configured in a different manner using the principles described herein.

The above specification, examples, and data provide a complete description of the composition, manufacture, and use of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

We claim:

1. A Radio Frequency Identification (RFID) tag configured to communicate with an RFID reader, the tag comprising:
    an Integrated Circuit (IC) including:
        a first antenna terminal and a second antenna terminal, wherein the first antenna terminal is coupled to a first input to a first rectifier through a first coupling capacitor and the second antenna terminal is coupled to a second input to the first rectifier through a second coupling capacitor; and
        a third antenna terminal and a fourth antenna terminal, wherein the third antenna terminal is coupled to a first input to a second rectifier through a third coupling capacitor and the fourth antenna terminal is coupled to a second input to the second rectifier through a fourth coupling capacitor;
    a near-field antenna coupled to the first antenna terminal and the second antenna terminal; and
    a far-field antenna coupled to the third antenna terminal and the fourth antenna terminal, wherein the first and second antenna-terminal pair and the third and fourth antenna-terminal pair are electrically isolated such that the near-field antenna and the far-field antenna operate independently from each other when electrically coupled to the IC, and do not share a common reference potential on the IC prior to respective couplings of the near-field antenna and the far-field antenna to the first and second rectifiers.

2. The RFID tag of claim 1, wherein at least one of the near-field antenna and the far-field antenna comprise at least one of:
    a patch, a slot, a dipole, a loop, a coil, a spiral, and a horn.

3. The RFID tag of claim 1, wherein the near-field antenna and the far-field antenna operating independently from each other comprises the first rectifier being configured to operate in a first frequency range and the second rectifier being configured to operate in a second frequency range.

4. The RFID tag of claim 1, wherein the IC further includes a first demodulator coupled to the first and second antenna terminals and a second demodulator coupled to the third and fourth antenna terminals.

5. The RFID tag of claim 4, wherein the near-field antenna and the far-field antenna operating independently from each other comprises the first demodulator being operable to demodulate symbols according to a first protocol and the second demodulator being operable to demodulate symbols according to a second protocol.

6. The RFID tag of claim 1, wherein the IC further includes a first modulator coupled to the first and second antenna terminals and a second modulator coupled to the third and fourth antenna terminals.

7. The RFID tag of claim 6, wherein the near-field antenna and the far-field antenna operating independently from each other comprises the first modulator being operable to modulate symbols according to a first protocol and the second modulator being operable to modulate symbols according to a second protocol.

8. The RFID tag of claim 1, wherein the near-field antenna and the far-field antenna operating independently from each other comprises the IC being configured to extract energy from an electromagnetic field incident on one of the first and second antenna-terminal pair and the third and fourth antenna-terminal pair and a demodulator coupled to the other of the first and second antenna-terminal pair and the third and fourth antenna-terminal pair being configured to demodulate symbols according to an RFID protocol.

9. The IC of claim 8, wherein the IC is configured to extract energy and the demodulator is configured to demodulate symbols simultaneously.

10. The RFID tag of claim 1, wherein the near-field antenna and the far-field antenna are formed on a common substrate.

11. An Integrated Circuit (IC) for a Radio Frequency Identification (RFID) tag configured to communicate with an RFID reader, the IC comprising:
   a first antenna terminal and a second antenna terminal, wherein the first antenna terminal is coupled to a first input to a first rectifier through a first coupling capacitor and the second antenna terminal is coupled to a second input to the first rectifier through a second coupling capacitor; and
   a third antenna terminal and a fourth antenna terminal, wherein the third antenna terminal is coupled to a first input to a second rectifier through a third coupling capacitor and the fourth antenna terminal is coupled to a second input to the second rectifier through a fourth coupling capacitor, wherein
   the first rectifier is configured to operate at a first frequency range;
   the second rectifier is configured to operate at a second frequency range; and
   the first and second antenna-terminal pair and the third and fourth antenna-terminal pair are electrically isolated such that a first antenna coupled to the first and second antenna terminals and a second antenna coupled to the third and fourth antenna terminals operate independently from each other when electrically coupled to the IC, and the first rectifier and the second rectifier do not share a common reference potential on the IC prior to respective couplings of the first and second antenna-terminal pair and the third and fourth antenna-terminal pair to the first and second rectifiers.

12. The IC of claim 11, wherein the first frequency range is one of:
   disjoint with the second frequency range;
   intersecting with the second frequency range, wherein the first frequency range extends into the second frequency range; and
   a proper subset of the second frequency range, wherein the first frequency range is a narrower subset of the second frequency range.

13. The IC of claim 11, further comprising a demodulator coupled to the first and second antenna terminals.

14. The IC of claim 13, wherein the first antenna and the second antenna operating independently from each other comprises the demodulator being configured to demodulate symbols received in the first frequency range according to an RFID protocol and the second rectifier being configured to extract energy from an electromagnetic field in the second frequency range.

15. The IC of claim 11, further comprising a first modulator coupled to the first and second antenna terminals and a second modulator coupled to the third and fourth antenna terminals.

16. The IC of claim 15, wherein the first antenna and the second antenna operating independently from each other comprises the first modulator being configured to modulate symbols according to a first protocol and the second modulator being configured to modulate symbols according to a second protocol.

17. An Integrated Circuit (IC) for a Radio Frequency Identification (RFID) tag configured to communicate with an RFID reader, the IC comprising:
   a first antenna terminal and a second antenna terminal, wherein the first antenna terminal is coupled to a first input to a first demodulator through a first coupling capacitor and the second antenna terminal is coupled to a second input to the first demodulator through a second coupling capacitor; and
   a third antenna terminal and a fourth antenna terminal, wherein the third antenna terminal is coupled to a first input to a second demodulator through a third coupling capacitor and the fourth antenna terminal is coupled to a second input to the second demodulator through a fourth coupling capacitor, wherein
   the first demodulator is configured to demodulate symbols according to a first protocol;
   the second demodulator is configured to demodulate symbols according to a second protocol different from the first protocol; and
   the first and second antenna-terminal pair and the third and fourth antenna-terminal pair are electrically isolated such that a first antenna coupled to the first and second antenna terminals and a second antenna coupled to the third and fourth antenna terminals operate independently from each other when electrically coupled to the IC, and the first demodulator and the second demodulator do not share a common reference potential on the IC prior to respective couplings of the first and second antenna-terminal pair and the third and fourth antenna-terminal pair to the first and second demodulators.

18. The IC of claim 17, further comprising a first rectifier coupled to the first and second antenna terminals and a second rectifier coupled to the third and fourth antenna terminals, wherein the first rectifier and the second rectifier are configured to operate at substantially different first and second frequency ranges.

19. The IC of claim 18, wherein the first frequency range is one of:
   disjoint with the second frequency range;
   intersecting with the second frequency range, wherein the first frequency range extends into the second frequency range; and
   a proper subset of the second frequency range, wherein the first frequency range is a narrower subset of the second frequency range.

* * * * *